United States Patent
Cook et al.

[15] 3,683,488
[45] Aug. 15, 1972

[54] METHODS OF BONDING METALS TOGETHER

[72] Inventors: Billy G. Cook, Booneville, Ark.; Barry Pollard, Pittsburgh, Pa.; Romulo M. Martinez, Chula Vista, Calif.

[73] Assignee: Rohr Corporation, Chula Vista, Calif.

[22] Filed: May 15, 1970

[21] Appl. No.: 37,873

[52] U.S. Cl. ......................29/472.3, 29/502, 204/16
[51] Int. Cl. ..............................................B23k 31/02
[58] Field of Search ................29/502, 472.3; 204/16

[56] References Cited

UNITED STATES PATENTS

| | | | |
|---|---|---|---|
| 2,532,283 | 12/1950 | Brenner | 29/502 UX |
| 2,900,713 | 8/1959 | Young | 29/502 X |
| 2,962,811 | 12/1960 | Herbert, Jr. | 29/502 X |
| 3,073,759 | 1/1963 | Wrant | 29/502 X |
| 3,091,845 | 6/1963 | Herman et al. | 29/502 X |
| 3,222,775 | 12/1965 | Whitney | 29/502 X |
| 3,365,787 | 1/1968 | Forsberg et al. | 29/502 X |
| 3,396,454 | 8/1968 | Murdock et al. | 29/502 X |
| 3,555,667 | 1/1971 | Carlson et al. | 29/502 X |
| 3,030,703 | 4/1962 | Wirsing, Jr. | 29/472.3 X |
| 3,068,565 | 12/1962 | King et al. | 29/472.3 |
| 3,327,382 | 6/1967 | Keeleric | 204/16 X |

*Primary Examiner*—John F. Campbell
*Assistant Examiner*—Ronald J. Shore
*Attorney*—George E. Pearson

[57] ABSTRACT

Metallic components such as facing sheets and honeycomb cores of structural panels are brazed together by electroplating different metals on a first component in superposed layers, pressing a second component against the first component and heating both components to a temperature which melts the electrodeposited metals, and cooling said components while they are pressed together to thereby solidify the melted metals and bond the components to each other.

4 Claims, No Drawings

METHODS OF BONDING METALS TOGETHER

SUMMARY OF THE INVENTION

This invention relates to brazing methods and to products formed by said methods, and more particularly to a method of joining metals together by electroplating metals on one of two components and then melting and thereafter solidifying the electroplated metals while a second component is pressed against the first.

Although not limited to a particular application, the invention disclosed herein can be used to great advantage in the fabrication of honeycomb core panels of the type employed as a sound suppressing material in aircraft. In such panels the edges of cells of a honeycomb core material must be bonded to a perforated facing sheet of feltmetal, and thus conventional brazing techniques are not completely satisfactory for use in their fabrication. For example, if braze alloy in sheet form is sandwiched between a honeycomb core and a perforated facing sheet to bond the same together when melted and then allowed to solidify, holes in the face sheet become clogged with the braze alloy and it is necessary to open them by some suitable cleaning step, thus adding to the cost of manufacturing a panel. Brazed joints which are formed by conventional brazing methods also contain more braze alloy than is needed for a strong bond, and the excess material adds undesirable extra weight to a structure such as an aircraft sound absorbing panel, which obviously should be as light as possible.

It was recognized that the elimination of the aforementioned clogging of holes in the perforated facing sheet or feltmetal of a sound suppression panel and the elimination of excessive braze alloy in the bonds formed between such sheet and a honeycomb core material could be effected by depositing a predetermined amount of braze alloy on the edges of said core so as to provide adequate material for bonding without adding an undesirable surplus. However, many of the procedures which appear suitable for use in applying a limited amount of braze alloy to the edges of a honeycomb core material have been found unsatisfactory for one reason or another. For example, it has been found impracticable to place powdered braze alloy on the edges of honeycomb core material in precisely measured, evenly distributed amounts.

The invention disclosed herein provides an effective procedure for bonding together metallic components by the use of an amount of bonding material which is not greater than that required to form a strong bond and which is uniformly distributed over the area at which said components are joined. The advantages of the invention are achieved by electrolytical deposition of at least two different bonding metals in successive layers on one of two metallic parts which must be bonded together. In some instances a suitable electrolytic masking material is utilized to limit the area at which deposition of the bonding metals occurs. After the bonding metals have been placed on the area of the first part where the second part is to be attached, the latter is pressed against an electroplated area of said first part and the components are heated to a temperature sufficient to melt both of the bonding metals. The parts are then allowed to cool while still being pressed together, which solidifies the bonding metals and produces a strong bond between the parts. Preferably the afore-described heating and cooling steps are carried out under an inert atmosphere or vacuum.

The particular metals which are selected to bond two components together depend upon the metal, or metals, of which said components are formed, the other requirements being that the bonding metals effect a proper bond between the components when melted and then solidified and that they have no adverse effect upon the joined metals, such as causing embrittlement thereof. The bonding metals can readily be electroplated on the base component in successive layers by first making the latter the cathode in an electrolytic system in which the first bonding metal to be deposited is the anode or dissolved metal in solution, and then making the base component the cathode in an electrolytic system in which the second bonding metal to be deposited is the anode or dissolved metal in solution. The superposed layers of bonding metals can be applied by various well-known electroplating techniques, such as by immersing the base component in an electrolyte or by contacting it with a roller which is partially immersed in an electrolyte and rotated so that the latter wets the entire surface of the roller and provides a path for electrolytic action. The order in which the different bonding metals are electroplated is immaterial.

One of the advantages of the disclosed invention is that it provides a convenient means for forming a brazed joint, or fillet, which will withstand a predetermined temperature. Thus if two metals have the proper characteristics for bonding certain metallic components together, the amounts of such metals which are electroplated on one of the components can readily be controlled so that the alloy which is formed of the metals, when they are melted and then solidified, has a predetermined composition and melting point.

Further details concerning the present invention will be given in the following description of specific examples of processes in accordance therewith.

EXAMPLE I

A sheet of PH 15-7 Mo, having a thickness of 0.020 inch, was made the cathode in an electrolytic system in which the electrolyte consisted of 240 grams per liter of nickel chloride. The anode was formed of nickel. Both the sheet of PH 15-7 Mo and the nickel anode were immersed in the electrolyte, and sufficient electric current was passed through the system to deposit 2 grams of nickel on the sheet per each square foot of surface area thereof. Additional constituents in the electrolyte were 30 grams per liter of boric acid and the balance water. The operating temperature was 130° F. Plating was performed at a density of 50 amperes per square foot. The plated sheet of PH 15-7 Mo was then removed from the first bath, rinsed with water, and made the cathode in an electrolytic system in which the electrolyte consisted of 9.4 grams per liter of potassium gold cyanide and 90 grams per liter of potassium cyanide; the balance was water. The anode was formed on 304 stainless steel. Again, both the plated sheet of PH 15-7 Mo and the 304 SS anode were immersed in the electrolyte, and sufficient electric current was passed through the system to deposit 3.0 grams per square foot of gold on the layer of nickel on said sheet. The electroplated sheet was rinsed with water after it was removed from the second electrolytic bath.

A second sheet of PH 15-7 Mo, also having a thickness of 0.020 inch, was next placed against one side of the sheet electroplated as aforesaid, and a pressure of about one pound per square inch was applied against the sheets by means of encapsulating the same in a stainless steel retort. The assembly was placed for 5 minutes in an oven maintained at a temperature of 1,950° F., and provided with a partial vacuum and argon atmosphere. The sheets were thereafter cooled to room temperature and then removed from the retort.

Examination of the sheets of bonded material showed that the layers of gold and nickel which were electroplated thereon had fused together and bonded the sheets together along their entire area of contact. The bond formed by the fused layers of gold and nickel melted at 1,950° F.

EXAMPLE II

Honeycomb core material, formed of PH 15-7 Mo and having a wall thickness of 0.003 inch, was coated with "Microshield" masking material by immersion. After the masking on the core was dried by air drying, the masking material on the edges of one side of the core was removed by manual honing or by immersion in a solvent such as methyl ethyl ketone to a depth of 0.003 inch.

The honeycomb core was next rinsed with water and then made the cathode in an electrolytic system in which electrolyte consisted of 240 grams per liter of nickel chloride. The anode was formed of nickel, and both the latter and the core were totally immersed in the electrolyte. Sufficient current was passed through the aforesaid system to electroplate 2 grams of nickel on the core for each square foot of exposed surface thereof (i.e., the surface of the core from which "Microshield" masking material has been removed). Additional constituents in the electrolyte were 30 grams per liter of boric acid and the balance water. The operating temperature was 130°F. Plating was performed at a density of 50 amperes per square foot. After being rinsed with water, the plate core was made the cathode in an electrolytic system in which the electrolyte consisted of 9.4 grams per liter of potassium gold cyanide and 90 grams per liter of potassium cyanide. The anode was 304 stainless steel. Again, both the anode and the cathode were immersed in the electrolyte, and sufficient electric current was passed through the system to deposit 3.0 grams per square foot of gold on the layer of nickel previously placed on the edges of the core, after which the latter was rinsed with water and dried by air drying.

A sheet of FM 134 felt metal having a thickness of 0.020 inch and a density of 1.1 pounds per ft.$^2$, supplied by Huyck Metals Company, was thereafter placed against the electroplated edges of the honeycomb core material, and a facing sheet was placed against the opposite side of the latter. The assembly was then placed in a vacuum envelope to thereby cause atmospheric air pressure to press the felt metal sheet and the facing sheet against the core, and the envelope was in turn placed in an oven and subjected to a temperature of 1,950°F. for 10 minutes. In the final step of the process, the envelope was removed from the oven and allowed to cool to ambient temperature.

It was found that the superposed layers of nickel and gold on the edges of the honeycomb core had fused together and bonded the core to the sheet of felt metal. The fillets formed at the interfaces of the felt metal sheet and the edges of the core were small in size compared to those formed by conventional brazing techniques, yet possessed the same strength. Furthermore, since the bond fillets were located only at the edges of the core there was minimal reduction in the porosity of the felt metal sheet.

III (OTHER EXAMPLES)

Additional metal combinations successfully plated on several metals such as A1S1321, PH 15-7 Mo, 17-7 PH, Inconel 625, and titanium and its alloys, included:

*A*
Nickel
Gold
Copper

*B*
Silver
Copper

*C*
Silver
Nickel
Copper

*D*
Silver
Gold
Copper

By varying the proportions of the plated metals in a given combination, the melting temperature of the combination may be made to range from a temperature just below the melting temperature of the metal having the highest melting temperature of the metals in the combination to a temperature well below the melting temperature of the metal having the lowest melting temperature of the metals in the combination. For example, a melting temperature used with a silver - copper - nickel combination was set at 1,650°F. which is lower than 1,769°F., the melting point of silver which has the lowest melting point of the metals in this combination.

The percentage by weight of the plated metals can thus be varied to obtain a range of melting temperatures extending from eutectic melting (lowest melting temperature for any combination) to temperatures approaching the melting point of each of the metals in the combination.

Although the invention has been shown and described in what is conceived to be the most practical and preferred method, it is recognized that departures may be made therefrom within the scope of the invention, which is not to be limited to the illustrative details disclosed.

What is claimed and desired to be secured by U. S. Letters Patent is:

1. For brazing together the elements of a sandwich panel comprising a honeycomb core, the cell walls of which comprise thin strips of selected metal, and a facing sheet of selected metal for brazing to each side of the core, at least one of which facing sheets is perforated, the method which comprises
- coating the cell walls of the core with soluble electrolytic masking material to prevent electroplating of the cell walls,
- stripping by dissolving the masking material from only the edge portions of the cell walls within the zone of the core immediately adjacent each edge of each cell wall to which a facing sheet is to be bonded,
- electroplating at least two successive layers of different, selected metals onto the stripped edge portions of the cell walls of the core, the metals used for such plating being selected from metals capable of brazing the cell walls of the core to the facing sheets,
- pressing one of the facing sheets against each side of the core,
- heating the core and facing sheets to a temperature to cause melting of the plated metals sufficient to braze the facing sheets to the core, while maintaining such pressure, on the facing sheets, and
- cooling the sandwich panel thus formed.

2. The method defined in claim 1 wherein said electrolytic masking material is removed from said portions of the cell walls of the core by immersing each side of the core to a predetermined depth in a liquid that dissolves said masking material.

3. The method defined in claim 1 wherein nickel and gold are two metals electroplated in successive layers on said cell wall edge portions.

4. For brazing together the elements of a sandwich panel comprising a honeycomb metal core, and a facing sheet of selected metal for brazing to each side of the core, at least one of which facing sheets is a felt metal comprising metal fibers, the method which comprises
- coating the cell walls of the core with electrolytic masking material of a type to prevent electroplating of the coated fibers,
- stripping the masking material from only the edge portions of the cell walls within the zone of the core immediately adjacent each side thereof to which a facing sheet is to be bonded,
- electroplating at least two successive layers of different metals onto the stripped portions of the cell walls of the core, the metals used for such plating being selected from metals capable of brazing the cell walls of the core to the facing sheets,
- pressing one of the facing sheets against each side of the core,
- heating the core and facing sheets to a temperature to cause melting of the plated metals sufficient to braze the facing sheets to the core, while maintaining such pressure, on the facing sheets, and
- cooling the sandwich panel thus formed.

* * * * *